Figure 6:
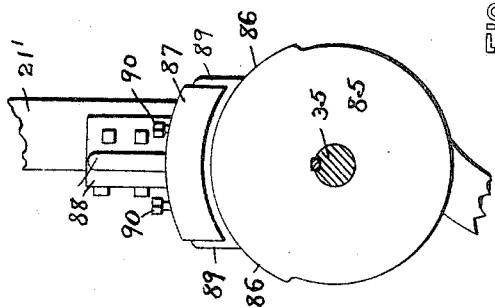

No. 680,937. Patented Aug. 20, 1901.
G. A. OHL, Sr., G. A. OHL, Jr., F. W. THEBERATH & A. A. BERGHOF.
POWER SHEARS.
(Application filed May 4, 1901.)
(No Model.) 4 Sheets—Sheet 1.
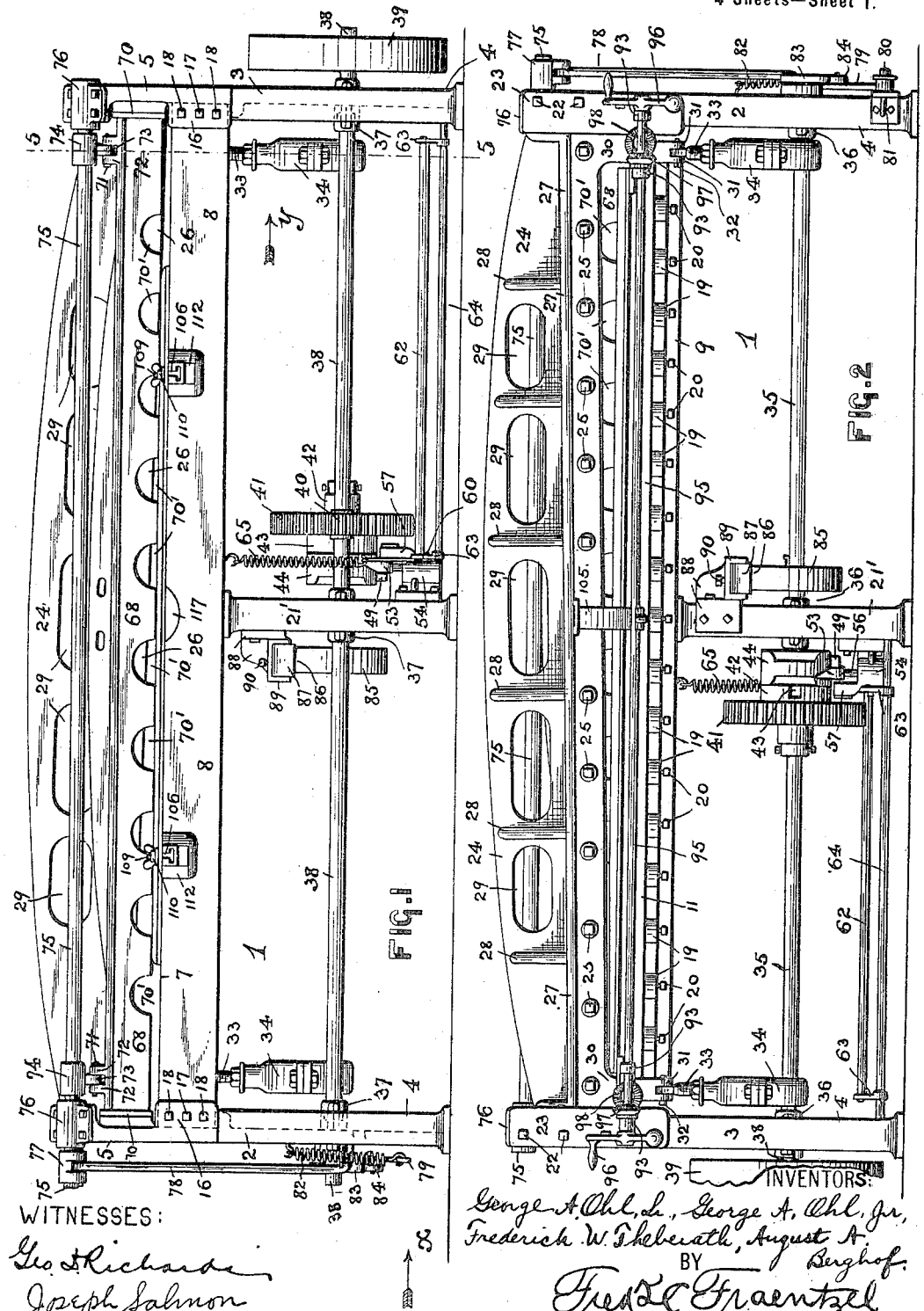
WITNESSES:
Geo. F. Richards
Joseph Salmon
INVENTORS:
George A. Ohl, Sr., George A. Ohl, Jr.,
Frederick W. Theberath, August A. Berghof.
BY
Fred C. Fraentzel,
ATTORNEY

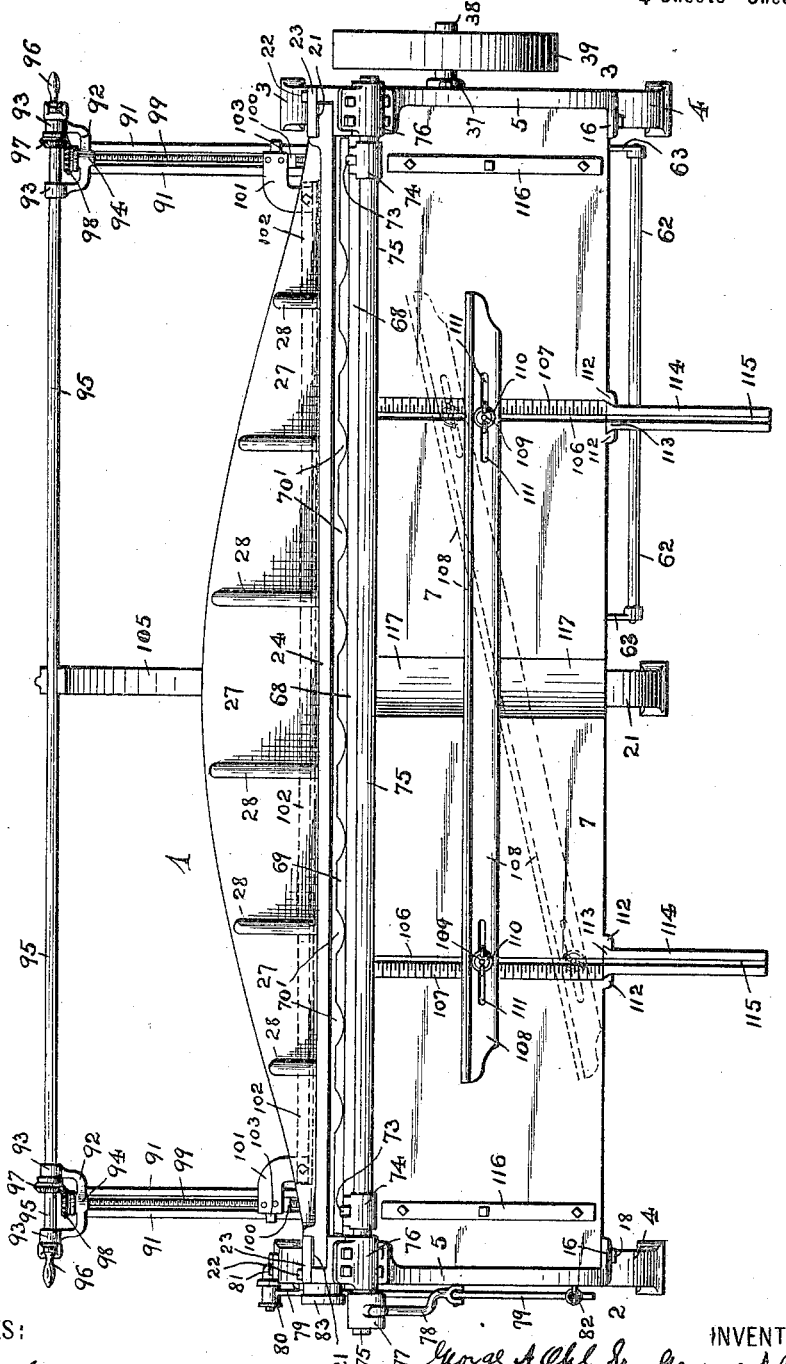

No. 680,937. Patented Aug. 20, 1901.
G. A. OHL, Sr., G. A. OHL, Jr., F. W. THEBERATH & A. A. BERGHOF.
POWER SHEARS.
(Application filed May 4, 1901.)
(No Model.) 4 Sheets—Sheet 3.

WITNESSES:
Geo. D. Richards
Joseph Salmon

INVENTORS:
George A. Ohl Sr., George A. Ohl Jr.,
Frederick W. Theberath, August
A. Berghof
BY
Fred'k C. Fraentzel
ATTORNEY No. 680,937. Patented Aug. 20, 1901.
G. A. OHL, Sr., G. A. OHL, Jr., F. W. THEBERATH & A. A. BERGHOF.
POWER SHEARS.
(Application filed May 4, 1901.)
(No Model.) 4 Sheets—Sheet 4.
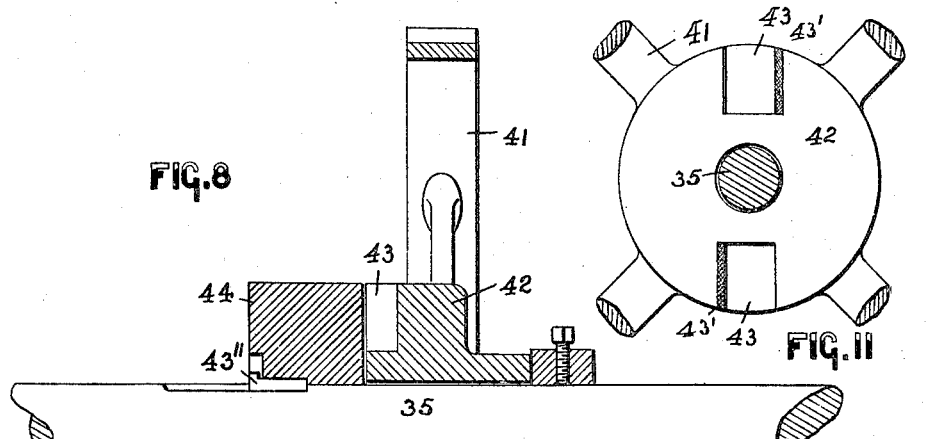
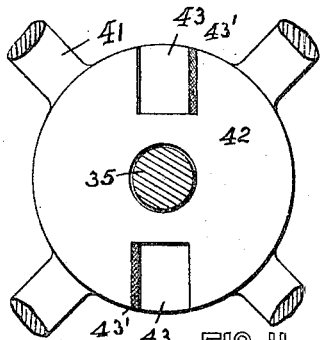
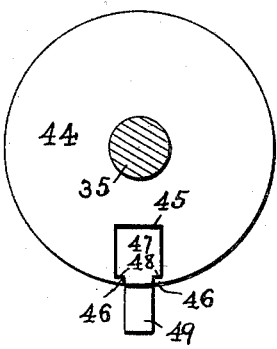
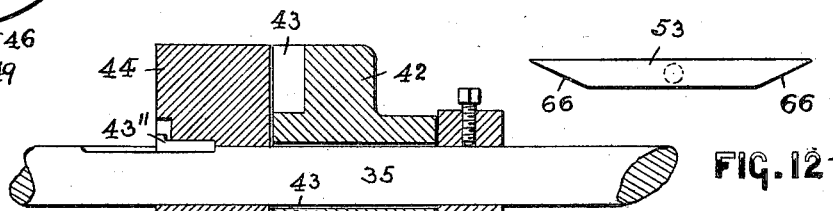
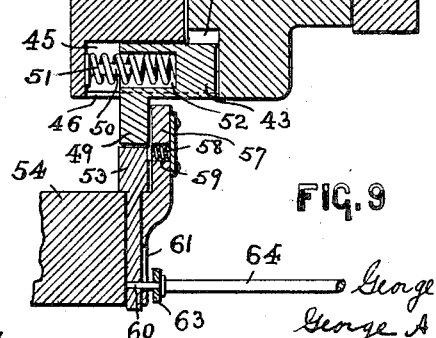
WITNESSES:
Geo. A. Richards
Joseph Salmon
INVENTORS:
George A. Ohl, Sr.
George A. Ohl, Jr.
Frederick W. Theberath
August A. Berghof
BY Fred C. Fraentzel,
ATTORNEY

UNITED STATES PATENT OFFICE.

GEORGE A. OHL, SR., GEORGE A. OHL, JR., FREDERICK W. THEBERATH, AND AUGUST A. BERGHOF, OF NEWARK, NEW JERSEY, ASSIGNORS TO GEORGE A. OHL & CO., OF NEW JERSEY.

POWER-SHEARS.

SPECIFICATION forming part of Letters Patent No. 680,937, dated August 20, 1901.

Application filed May 4, 1901. Serial No. 58,675. (No model.)

*To all whom it may concern:*

Be it known that we, GEORGE A. OHL, Sr., GEORGE A. OHL, Jr., FREDERICK W. THEBERATH, and AUGUST A. BERGHOF, citizens of the United States, residing at Newark, in the county of Essex and State of New Jersey, have invented certain new and useful Improvements in Power-Shears; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to improvements in that class of shears which are driven by power and are for the purpose of cutting or shearing sheet metal into strips or plates of different widths.

The primary object of this invention is to provide a machine known to the trade as a "power squaring-shears," which is to be employed for the cutting or shearing of sheet metal or the like, such sheet metal being fed upon a cutting bed or table of the machine by an operator, where the sheet is automatically held or clamped in position and is then cut or sheared according to the gage or gages to which the parts have been set, the said operations of first clamping or holding the metal sheet in position and then cutting or shearing off therefrom pieces of the desired widths following in rapid and consecutive order without having to remove the sheet after each cut.

A further object of this invention is to improve the general arrangements and constructions of the various parts and the operating devices of a machine of the character hereinafter more fully described, whereby a shears is provided the knife-head of which is exceptionally strong and is fitted in side bearings to prevent springing, said bearings forming suitable guides in which the said head reciprocates.

The invention has for its further object to provide a novel arrangement of such guides and the supporting-legs of the machine all made in one integral piece or casting, the said guides being fitted with detachable gibs for adjustment to compensate for any wear; furthermore, to so arrange and construct the cutting bed or table of the machine that it may be adjusted in a direction either toward or from the edge of the cutting knife or shear.

The invention has for its further objects to provide the clamping-leaf with openings for inspecting the gage or prick-marks on the metal to be sheared and regulate the position of the sheet upon the cutting bed or table, and, further, bringing that part of the metal sheet in alinement with the cutting edge of the shear or knife for the purpose of first squaring the edge of the metal sheet prior to the cutting off of the pieces having the widths required.

Other objects of this invention are the arrangement of an automatic clutch mechanism provided with a brake attachment the parts of which are arranged so that the knife-head will automatically stop at the top of each stroke or can be made to run continuously, if desired, by keeping the foot upon a treadle connected with the frame of the machine; furthermore, the automatic clamping-leaf or holddown which retains the metal sheet firmly in its position upon the cutting bed or table while the cut is being made, thus insuring great accuracy, and, finally, providing a machine of this character with gages of the various construction both at the front and back of the machine, for the purposes hereinafter more fully specified.

The present invention therefore consists in the general construction of power-shears hereinafter fully set forth; and, furthermore, the invention consists in the several novel arrangements and combinations of the various mechanism and the details of the construction thereof, all of which will be fully described in the following specification and then finally embodied in the clauses of the claim, which form a part of this specification.

The invention is clearly illustrated in the accompanying drawings, in which—

Figure 7:
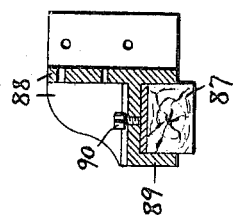
Figure 4:
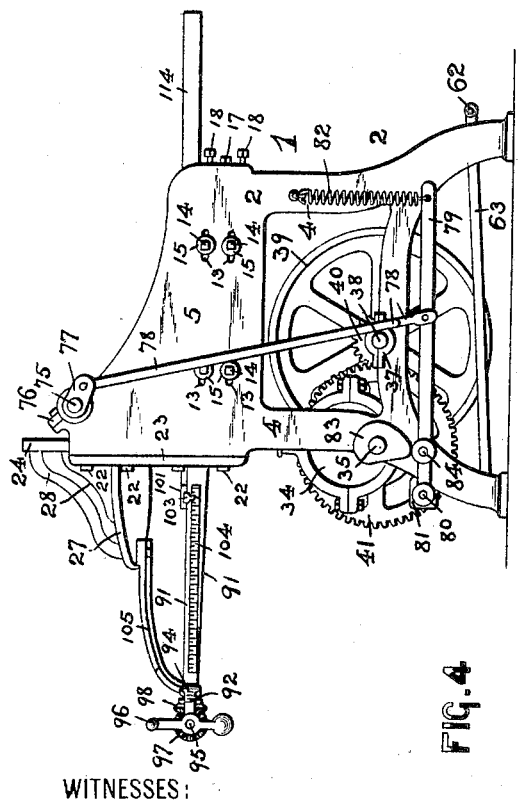
Figure 5:
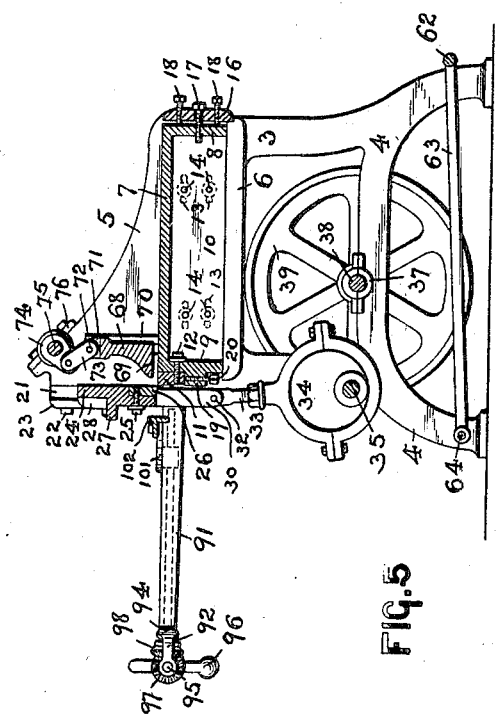

Figures 1 and 2 are a front and rear elevation, respectively, of a power-shears or cutting apparatus embodying the principles of this invention; and Fig. 3 is a plan or top view of the same. Fig. 4 is an end view of the machine looking in the direction of the arrow $x$ in Fig. 1 of the drawings; and Fig. 5 is a vertical cross-section, taken on line 5 5 in said Fig. 1, looking in the direction of the arrow $y$. Fig. 6 is a face view of the form of brake employed with the present construction of machine, and Fig. 7 is a vertical section of the brake-shoe and holder and a bracket attachment therefor. Fig. 8 is a vertical representation of the clutch mechanism, the several parts being represented in their disengaged positions and when the clamping-leaf or holddown and the cutter or shears are in their operative positions. Fig. 9 is a similar section of the several parts indicated in said Fig. 8, with the clutch members in their engaged or operated positions. Fig. 10 is a face view of the clutch device or disk and a sliding clutch-dog connected therewith. Fig. 11 is a face view of the gear-hub, with which said clutch-dog can be brought in operative engagement; and Fig. 12 is a side and top view of one form of sliding sector for releasing the clutch-dog from its inactive position with the gear-hub and also for disengaging said clutch-dog from its engaged and active position with said hub.

Similar numerals of reference are employed in all of the said above-described views to indicate corresponding parts.

In the said drawings, 1 indicates the complete machine, which comprises a pair of end standards 2 and 3, each standard consisting, essentially, of a lower supporting leg or portion 4 and an upper guide plate or member 5, these several parts all being preferably cast in one piece to provide great strength and stability. Each guide plate or member 5 is formed with a laterally-extending supporting rib or projection 6, as clearly illustrated in Fig. 5 of the drawings, upon which rests a work-supporting or cutting bed or table 7. This table 7 is preferably made in the manner of an inverted box, being formed with the two longitudinal sides 8 and 9 and the respective ends 10. The said table or bed 7 is also capable of a sufficient movement in a direction toward the rear of the machine for the proper adjustment of the shearing member 11, which is secured upon the back edge of said table by means of bolts or screws 12 or in any other suitable manner for bringing its shearing edge in proper alinement with the cutting edge of the reciprocating knife, to be hereinafter more fully described. That the said table or bed 7 may be adjusted in this manner the guide plates or members 5 are formed with suitably-placed longitudinal slots or openings 13, in which are arranged certain cap-screws 14, said screws having their heads placed against washers 15 and their screw portions being screwed into the ends 10 of the said table or bed 7. As will be seen from Figs. 1 and 5, the said guide plates or members 5 are also provided with inwardly-extending holding members 16, each member being provided with an arrangement of three or more holes for the reception of cap-screws 17 and set-screws 18 in the manner shown. The said cap-screws 17, as will be seen from an inspection of said Fig. 5, have their screw-bodies screwed directly into the side 8 of the table or bed 7, while the said set-screws 18 are made in such a manner that the free ends of said screws are in contacting engagement with the outer face of said side 8. Thus it will be evident that when the table or bed 7 is to be moved for its adjustment toward the knife-edge the several screws or bolts 14 in the sides are loosened and the screws 18 are turned that their points or ends while moving in an inward direction will work against the outer face of said side 8 and force the bed or table toward the back of the machine for the proper adjustment of the parts. During this movement the said screws 17, having their shanks or bodies slidably arranged in the plain holes in the members 16, as illustrated, will not interfere with the operations of the parts. After the desired adjustment has been made the screws or bolts 17 are tightened and the side 8 of the table or bed 7 is tightly locked against the pointed ends of the screws 18. At the same time the cap-screws 15 in the guide plates or members 5 are also screwed down tightly, whereby the bed or table 7 is immovably held in its adjusted position for the reception of the sheet metal or the like which is to be sheared or cut. To remove all unnecessary strain from upon the screws 12, which hold the lower shear-blade 11 in position during the cutting operations and to prevent the possible "shearing off" of the said screws 12, and, furthermore, to provide for any necessary vertical adjustment of the said shear-blade 11, the longitudinal side 9 at the back of the said bed or table 7 is provided with suitably-disposed lugs or other means provided with screw-holes, in which are arranged the set-screws 20, the free ends of which can be firmly brought against the under surface of the shear-blade 11, substantially as illustrated in said Fig. 5 of the drawings. The table or bed 7 is also supported at the middle upon a standard or frame-piece 21'. The said guide plates or members 5 are provided at the back and upon their inner faces with the vertically arranged and recessed portions 21, over which are secured, preferably, by means of the screws or bolts 22, plates 23, as illustrated more particularly in Figs. 2, 3, and 4, the said plates 23 forming, with said recessed portions 21, a vertical guide at each side of the machine, in which the respective ends of a knife-head 24 are slidably arranged substantially in the manner to be presently more fully described. This knife-head has secured along its lower edge by means of bolts 25, preferably in a recess made for the purpose, the upper shear blade or cutter 26. To prevent the springing of said knife-head and its blade, the said head 24 is formed with a rearwardly-extending rib 27 and the vertically-arranged ribs 28. Openings 29 may be formed in the said knife-head between the said ribs 28 to reduce the weight and cost of construction of the knife-head. Extending downwardly from the lower edge of the said knife-head at or near the respective ends of the same, as shown in Fig. 2, are arms 30, which are provided at their free ends with perforated ears 31. Pivotally arranged between the said ears and suspended from pins 32 are rods 33, which are adjustably connected with suitably-constructed eccentrics 34 or other means connected with and operated from a shaft 35. This shaft is rotatably arranged in bearings 36 on the several standards 2, 3, and 21' of the machine. Thus it will be evident that the said shaft 35 and the eccentrics will retain the knife-head 24 in its reciprocatory position in the guides formed by the recesses 21 and the plates 23, hereinabove mentioned. Rotatively arranged in other bearings 37 on the standards 2, 3, and 21', as will be seen from an inspection of Fig. 1 of the drawings, is a main driving-shaft 38, which is provided with a driving or operating wheel 39, and has secured on said shaft at any desirable point a toothed pinion 40, which is in mesh with a gear-wheel 41, loosely placed upon the said shaft 35, and which arrangement permits the shaft 38 to be driven from the driving-wheel 39 without causing any rotations of the shaft 35 and its parts thereon except as hereinafter provided. The said gear-wheel 41, as will be seen from an inspection more especially of Figs. 8 and 9, is also provided with a hub 42, formed with one or more receiving sockets or recesses 43, usually arranged as shown herein. Adjacent to the said hub 42 of the gear 41 and secured in a fixed position upon said shaft 35, preferably by means of a key 43'', is a clutch disk or wheel 44, which is provided with a recessed portion 45 of any desirable and practical shape in cross-section. Slidably arranged upon ways 46 in said recessed portion 45, as clearly illustrated, or arranged therein in any other usual manner is a clutch-dog 47, which is usually formed with shoulders or ribs 48, by means of which said dog is held in its operative and sliding position upon said ways 46. The said clutch-dog is also provided with a downwardly-extending stud or spur 49, and secured within said recessed portion 45 is a pin or post 50, which has a coiled spring 51 arranged thereon, as shown, the said spring projecting into a receiving-socket 52 in the back of the clutch-dog 47. The purpose of this spring is to force the said clutch-dog into one of the said receiving sockets or recesses 43 in the hub 42 of the gear-wheel 41 against a steel or other hard-metal shield or plate 43' in each recess to prevent frictional wear when a vertically-sliding sector 53 of any suitable construction is withdrawn from in front of the said clutch-dog 46 in the manner to be presently more fully described, and thereby causing the shaft 35 to revolve and actuate the eccentrics which produce the reciprocatory movements of the knife-head and the knife or cutting-shear attached to said head. The mechanism for withdrawing the sliding sector 53 from in front of the said stud or spur of the clutch-dog 47 (represented in Fig. 8) to the released position (indicated in Fig. 9 of the drawings) consists, essentially, of a suitably-constructed bracket 54, which, as will be seen from Figs. 1 and 2, is secured against the side of the middle standard or frame 21'. This bracket is formed with a vertical duct or guide 55, into which is fitted a downwardly-extending footpiece or arm 56 on said sector 53, the said sector being held in its operative position against turning laterally by means of an upwardly-extending projection or flat post 57 on said bracket, and said projection or post 57 being provided with a socket 59, in which is a suitable spring 58, which under normal conditions holds the end of the clutch-dog away from sliding contact with the adjacent face of the hub 42, and thereby prevents any clicking noise between the contact-surfaces, as is so usual in the constructions of clutch mechanisms now made. The lower part of the said footpiece 56 is connected by means of a pin 60, which extends in a lateral direction through a slot or opening 61 in the side of the bracket 54, and said slot 61 forming a guide in which said pin 60 can move up and down to one of a pair of side bars 63 of a suitably-constructed treadle 62, as clearly illustrated. This treadle 62 is secured upon a rod 64, which is pivoted at its ends in suitable bearings in the standards of the machine, and it is held under normal conditions in its raised position by means of a spring 65. When held in such raised position by means of this spring 65, the curved body of the sliding sector 53 will extend partly around the lower cylindrical portion of the clutch disk or wheel 44, whereby the clutch-dog 47 is retained in its inoperative position, (indicated in Fig. 8,) the spring 58 meanwhile holding the said clutch-dog away from frictional and noisy contact with the adjacent face of the gear-hub 42, as previously mentioned. As soon as the treadle 62 is depressed by the operator the sliding sector 53 is made to assume the position represented in said Fig. 9, and having thus been withdrawn from its holding engagement with the stud or projection 49 of the clutch-dog 47 the said dog is immediately forced into one of the now oppositely-placed recesses 43 in the said hub 42 of the gear 41, whereby the shaft 35 is made to revolve, and the eccentrics thereon will cause the reciprocatory motion of the knife-head and its cutting blade or shear in the manner hereinabove stated. The rotary motion of the shaft 35 and the movements of the various mechanism will continue as long as the treadle 62 remains depressed by the foot of the operator; but as soon as the pressure is removed from the treadle then the spring 65 causes the sliding sector 53 to again move in an upward direction, whereby a chamfered portion or knife-edge 66 of said sector is brought in sliding engagement with the projection or stud of the clutch-dog 47, and said dog is thereby withdrawn from its engagement with the recessed portion in the hub 42 of the said gear 41 and the operations of the parts of the machine will immediately cease.

Having thus described the constructions and operations of the devices and mechanism for actuating the knife-head and its cutter, we will now describe the arrangement of and the means for operating a clamping-leaf or holddown 68, which is brought down upon the metal to be cut prior to the cutting or shearing operation of the cutter or shears 26. This clamping-leaf 68 is preferably provided with a flat base 69, which is positively brought down upon the metal sheet and fully rests thereon for retaining the sheet in position upon the cutting table or bed 7. The clamping-leaf has its ends slidably arranged in guides 70 in the inner faces of the guide plates or members 5, and upon its upper edge it is provided with perforated ears or lugs 71 and pivotal pins 72. Upon these pins 72 are links 73, which in turn are suitably connected with cranks 74, arranged upon a shaft 75. This shaft is held above the bed or table 7 by having its ends rotatively arranged in bearings 76 upon the guide plates or members 5, as clearly illustrated. That the said shaft 75 may receive an oscillatory motion in its bearings and cause the clamping-leaf or holddown 68 to move in its guides 70 a crank-arm 77 is attached upon the outer end of the shaft 75 at one side of the machine, said arm 77 having pivotally connected therewith a rod or link 78, which is also pivotally attached at its lower end to a lever 79. This lever 79 is pivoted upon a pin 80 in a bracket 81 at the side of the leg 4 of the standard 2 and has a spring 82 connected with its opposite and free end, as shown in Fig. 4. Upon the free end of the shaft 35, which projects from the side of the standard 2, is a cam 83, the cam-surface of which is in sliding engagement with a roller 84 on said lever 79, as shown. Thus it will be evident that as the shaft 35 revolves the said cam 83 will cause an oscillatory motion of the lever 79, the spring 82 at all times maintaining the close rolling contact of the roller 84 against the cam and by the resilient action of its coils permitting the clamping-leaf or holddown to accommodate itself to sheet metal of varying thicknesses. When the cam is in the position indicated in Fig. 4, then the several parts—that is, the lever 79 and the rod or link 78—will have brought the clamping-leaf or holddown 68 in its raised position (indicated in Fig. 5) for the placing of the metal sheet beneath its shoe 69 and also between the blades or cutters. The several parts of mechanism or devices are so arranged that when the shaft 35 revolves in its bearings the clamping-leaf or holddown will descend upon the metal prior to the descent of the shear-blade of the knife-head, and the latter and its blade after shearing or cutting the metal will return to its former position before the clamping-leaf or holddown is again raised by the action of the cam 83 upon the roller 84 and the spring-actuated lever 79 and connecting parts. Upon the said shaft 35 we have also secured a brake-wheel 85, which is provided with a braking-surface 86, (see Fig. 6,) and which is brought in holding frictional engagement with a brake-shoe 87, made of wood or any other suitable material, at the time the said clamping-leaf or holddown 68 is raised and the knife-head and cutter are at their top stroke. This brake-shoe is preferably adjustably secured in a receiving-box or other holder 89 of a suitably-constructed bracket 88 by means of adjusting-screws 90, the said bracket 88 being secured against the frame or standard 21' or another suitable part of the machine. This brake device is constructed in such a manner that the braking-surface 86 engages the brake-shoe 87 immediately upon the return of the said knife-head and cutter and upon the upward return of the said clamping-leaf, whereby the possible or accidental descent of these parts upon the hands of the operator while placing the metal to be cut upon the table or bed 7 or while making the proper adjustments of the parts is entirely overcome.

The knife-head of the machine is provided at the back with a pair of rearwardly-extending guides 91 near each side of the machine, each pair of guides 91 being connected by a suitable bracket 92, having bearings 93 and 94. In the bearings 93 is a shaft 95, which can be operated by means of a crank 96 at either end or at both ends of the shaft, bevel-gears 97 on said shaft 95 meshing with bevel-gears 98, secured to the free ends of screw-rods 99, rotatively arranged in the bearings 94 and extending longitudinally between the guides 91, as illustrated. Upon each screw-rod 99 is a block or nut 100, which moves between the guides 91 when the screws are operated from the shaft 95 by the turning of the crank or cranks 96. Brackets 101 are secured to each nut 100, said brackets 101 having a gage-strip 102 secured thereon, against which the edge of the metal sheet is placed. One or both of said brackets 101 may be provided with a pointer 103, which can be moved along an index 104 for the proper adjustments of the movable nuts 100 and the gage-strip 102, as will be clearly evident. The auxiliary bracket 105 may be provided for retaining the shaft 95, which is of considerable length, in its proper alinement, the said bracket being secured against the under side of the flange 27 of the knife-head 24, substantially as illustrated in Fig. 4 of the drawings. It will thus be seen that the said gage and its means of adjustment will move up and down simultaneously with the reciprocatory movements of the said knife-head. By this arrangement of the hereinabove-described parts it will be clearly evident that the gage-strip 102 can be quickly set for the cutting of strips of sheet metal or the like from three-eighths of an inch to eighteen inches in width, the openings 70' in the clamping-leaf or holding 68 being for the purpose of enabling the operator to see the gage-marks upon the sheet to which it is to be cut and also enabling him, if required, to see that the edge of the said strip of sheet metal has been properly placed against the gage-strip 102.

From an inspection of Fig. 3 it will be seen that the bed or table 7 is provided with two or more slots 106 and adjacent scales 107, above which is slidably arranged a gage-plate 108. This plate 108 can be secured in its adjusted positions by means of a suitable arrangement of nuts 110 and screws 109, the heads of which are slidably arranged in said slots 106, their shanks or bodies extending through openings 111 in the said plate 108. The said bed or table 7 may also be provided along its front edge with receiving-lugs 112, of any suitable construction, into which can be slipped the wedge-shaped ends 113 of certain bars 114, provided with grooves or slots 115, as shown. These grooves 115 are in alinement with the slots 106 in the bed or table 7, and thereby provide for a large range of adjustment of the gage-plate 108 beyond the front edge of the bed or table. When not in use the said bars 114 can be easily removed from the receiving or holding lugs 112. Guides 116 may be placed upon the bed or table 7, against which the side edges of the metal sheets can be placed for properly guiding the sheet beneath the knife-blade or cutters to trim or cut the sheet perfectly square. The table or bed 7 may also be provided with a groove or depression 117 for placing the hand beneath the cut strip of sheet metal and removing the same from between the knife and the said gage strip or plate 108. The openings 111 in the plate 108 are preferably made in the manner of elongated slots, as shown, which permits of an angular arrangement of the gage 108 above the said bed or plate 7, as indicated in dotted outline in said Fig. 3.

The machine is ordinarily so constructed that the gage-plate 108 can be set for trimming and squaring the edges of sheets of metal, as well as for cutting strips or sheets of metal from one inch in width to widths of thirty-six inches and over.

It will be understood that many variations of construction and changes in the arrangements and combinations of the devices may be made without departing from the scope of our present invention. Hence we do not limit our invention to the exact arrangements and combinations of the devices and parts as herein described and as illustrated in the accompanying drawings, nor do we confine ourselves to the exact details of the construction of any of the said parts.

Having thus described our invention, what we claim is—

1. In a machine for cutting sheet metal, the combination, with a bed or table and standards comprising guide members, of a knife-head and cutter, mechanism for causing a reciprocatory motion of said knife-head and cutter, a clamping-leaf and mechanism for actuating said clamping-leaf, said knife-head-operating mechanism and the clamping-leaf-operating mechanism being arranged to operate the said clamping-leaf and the knife-head and cutter consecutively without removing the metal sheet, substantially as and for the purposes set forth.

2. In a machine for cutting sheet metal, the combination, with a bed or table, and standards, comprising, a pair of combined foot-pieces and guide members, said guide members having vertical guides 21 and 70, a knife-head movably arranged in said guides 21, a cutter on said knife-head, and mechanism for causing a reciprocatory motion of said knife-head and cutter, a clamping-leaf movably arranged in said guides 70, and mechanism for actuating said clamping-leaf, said knife-head-operating mechanism and the clamping-leaf-actuating mechanism being arranged to operate the said clamping-leaf and the knife-head and cutter consecutively without removing the metal sheet, substantially as and for the purposes set forth.

3. In a machine for cutting sheet metal, the combination, with a bed or table and standards comprising, a pair of combined foot-pieces and guide members, of a knife-head and cutter, and mechanism for causing a reciprocatory motion of said knife-head and cutter, consisting, essentially, of downwardly-extending arms having perforated ears, pivotal pins in said ears, a shaft, eccentrics on said shaft, and links between said eccentrics and said pivotal pins, substantially as and for the purposes set forth.

4. In a machine for cutting sheet metal, the combination, with a bed or table and standards, comprising, a pair of combined foot-pieces and guide members, said guide members having vertical guides 21, a knife-head movably arranged in said guides, a cutter on said knife-head, and mechanism for causing a reciprocatory motion of said knife-head and cutter, consisting, essentially, of downwardly-extending arms having perforated ears, pivotal pins in said ears, a shaft rotatably arranged in bearings in said footpieces, eccentrics on said shaft, and links between said eccentrics and said pivotal pins, substantially as and for the purposes set forth.

5. In a machine for cutting sheet metal, the combination, with supporting-standards, and a bed or table thereon, of a knife-head and cutter, and mechanism for causing a reciprocatory motion of said knife-head and cutter, consisting, essentially, of a main driving-shaft 38 rotatably arranged in bearings in said standards, a pinion on said shaft 38, a second shaft 35 rotatably arranged in bearings in said standards, an actuating means on said shaft 35 connected with said knife-head, a gear on said shaft 35 in mesh with said pinion on said shaft 38, said gear having a recessed hub, a clutch-disk on said shaft 35 having a chambered portion, a spring-actuated holding-dog in the chambered portion of said clutch-disk, and means for releasing said holding-dog and causing it to engage with said recessed hub of the gear on said shaft 35, substantially as and for the purpose set forth.

6. In a machine for cutting sheet metal, the combination, with supporting-standards and a bed or table thereon, of a knife-head and cutter, and mechanism for causing a reciprocatory motion of said knife-head and cutter, consisting, essentially, of a main driving-shaft 38 rotatably arranged in bearings in said standards, a pinion 40 on said shaft 38, a second shaft 35 rotatably arranged in bearings in said standards, an actuating means on said shaft 35 connected with said knife-head, a gear on said shaft 35 in mesh with said pinion 40, having a recessed hub, a clutch-disk on said shaft 35 having a chambered portion, a spring-actuated holding-dog in the chambered portion of said clutch-disk, and means for releasing said holding-dog and causing it to engage with said recessed hub of the gear on said shaft 35, consisting, of a bearing 54, provided with a guide 55, a sliding sector above said bearing 54, normally in holding engagement with said holding-dog, a guide-arm on said sector arranged in said guide 55, and a treadle with which said guide-arm is connected for withdrawing said sector from its holding engagement with said holding-dog, substantially as and for the purposes set forth.

7. In a machine for cutting sheet metal, the combination, with supporting-standards, and a bed or table thereon, of a knife-head and cutter, and mechanism for causing a reciprocatory motion of said knife-head and cutter, a shaft on which the said knife-head-operating mechanism is arranged, a brake-pulley on said shaft having a reduced peripheral edge, and a brake-shoe connected with one of said standards and adapted to engage the braking-surface of said pulley when the knife-head is at the top of its stroke, substantially as and for the purposes set forth.

8. In a machine for cutting sheet metal, the combination, with supporting-standards, and a bed or table thereon, of a knife-head and cutter, and mechanism for causing a reciprocatory motion of said knife-head and cutter, a shaft on which the said knife-head-operating mechanism is arranged, a brake-pulley 85 on said shaft, provided with a partial peripheral braking-surface 86, a bracket on one of said standards having a brake-shoe-receiving portion, and a brake-shoe adjustably arranged in said receiving portion, adapted to engage said braking-surface 86 of said pulley when the knife-head is at the top of its stroke, substantially as and for the purposes set forth.

9. In a machine for cutting sheet metal, the combination, with a bed or table, and standards, comprising, a pair of combined foot-pieces and guide members, said guide members having vertical guides 21, a knife-head movably arranged in said guides, a cutter on said knife-head, and mechanism for causing a reciprocatory motion of said knife-head and cutter, consisting, essentially, of downwardly-extending arms having perforated ears, pivotal pins in said ears, a shaft 35 rotatably arranged in bearings in said footpieces, eccentrics on said shaft 35, and links between said eccentrics and said pivotal pins, a main driving-shaft 38 rotatably arranged in bearings in said footpieces, a pinion 40 on said shaft 38, a gear on said shaft 35 in mesh with said pinion, having a recessed hub, a clutch-disk on said shaft 35 having a chambered portion, a spring-actuated holding-dog in the chambered portion of said clutch-disk, and means for releasing said holding-dog and causing it to engage with said recessed hub of the gear on said shaft 35, substantially as and for the purposes set forth.

10. In a machine for cutting sheet metal, the combination, with a bed or plate and standards, comprising, a pair of combined footpieces and guide members, said guide members having vertical guides 21, a knife-head movably arranged in said guides, a cutter on said knife-head, and mechanism for causing a reciprocatory motion of said knife-head and cutter, consisting, essentially, of downwardly-extending arms having perforated ears, pivotal pins in said ears, a shaft 35 rotatably arranged in bearings in said footpieces, eccentrics on said shaft 35, and links between said eccentrics and said pivotal pins, a main driving-shaft 38 rotatably arranged in bearings in said footpieces, a pinion 40 on said shaft 38, a gear on said shaft 35 in mesh with said pinion, having a recessed hub, a clutch-disk on said shaft 35 having a chambered portion, a spring-actuated holding-dog in the chambered portion of said clutch-disk, and means for releasing said holding-dog and causing it to engage with said recessed hub of the gear on said shaft 35, consisting, of a bearing 54, provided with a guide 55, a sliding sector above said bearing 54 and in normal engagement with said holding-dog, a guide-arm on said sector arranged in said guide 55, and a treadle with which said guide-arm is connected for withdrawing said sector from its holding engagement with said holding-dog, substantially as and for the purposes set forth.

11. In a machine for cutting sheet metal, the combination, with a bed or plate and standards, comprising, guide members, of a knife-head and cutter, a shaft 35, and mechanism for causing a reciprocatory motion of said knife-head and cutter, bearings 76 connected with said guide members, a shaft 75 in said bearings, and a clamping-leaf suspended from said shaft 75, and means for causing a reciprocatory motion of said clamping-leaf, consisting, essentially, of a crank-arm 77 on said shaft 75, a spring-actuated lever pivoted to one of said standards, a connecting-link between said crank-arm 77 and said lever, and means on said shaft 35 for causing an oscillatory motion of said lever, substantially as and for the purposes set forth.

12. In a machine for cutting sheet metal, the combination, with a bed or plate and standards, comprising, guide members, of a knife-head and cutter, a shaft 35, and mechanism for causing a reciprocatory motion of said knife-head and cutter, bearings 76 connected with said guide members, a shaft 75 in said bearings, and a clamping-leaf suspended from said shaft 75, and means for causing a reciprocatory motion of said clamping-leaf, consisting, essentially, of a crank-arm 77 on said shaft 75, a spring-actuated lever pivoted to one of said standards, a connecting-link between said crank-arm 77 and said lever, a roller 84 on said lever, and a cam on said shaft in sliding engagement with said roller for causing an oscillatory motion of said lever and the parts connected therewith, substantially as and for the purposes set forth.

13. In a machine for cutting sheet metal, the combination, with a bed or table and standards, comprising, a pair of combined footpieces and guide members, said guide members having vertical guides 21, a knife-head movably arranged in said guides, a cutter on said knife-head, a shaft 35, and mechanism for causing a reciprocatory motion of said knife-head and cutter, vertical guides 70 in said guide members, bearings 76 connected with said guide members, a shaft 75 in said bearings 76, cranks 74 on said shaft, and a link 73 connected with each crank 74, a clamping-leaf suspended from said links, having its ends slidably arranged in said guides 70, and means for causing a reciprocatory motion of said clamping-leaf, consisting, essentially, of a crank-arm 77 on said shaft 75, a spring-actuated lever pivoted to one of said footpieces, a connecting-link between said crank-arm 77 and said lever, and means on said shaft 35 for causing an oscillatory motion of said lever, substantially as and for the purposes set forth.

14. In a machine for cutting sheet metal, the combination, with a bed or table and standards, comprising, a pair of combined footpieces and guide members, said guide members having vertical guides 21, a knife-head movably arranged in said guides, a cutter on said knife-head, a shaft 35, and mechanism for causing a reciprocatory motion of said knife-head and cutter, vertical guides 70 in said guide members, bearings 76 connected with said guide members, a shaft 75 in said bearings 76, cranks 74 on said shaft, and a link 73 connected with each crank 74, a clamping-leaf suspended from said links, having its ends slidably arranged in said guides 70, and means for causing a reciprocatory motion of said clamping-leaf, consisting, essentially, of a crank-arm 77 on said shaft 75, a spring-actuated lever pivoted to one of said footpieces, a connecting-link between said crank-arm 77 and said lever, a roller 84 on said lever, and a cam on said shaft in sliding engagement with said roller for causing an oscillatory motion of said lever and the parts connected with said lever, substantially as and for the purposes set forth.

15. In a machine for cutting sheet metal, the combination, with standards having supporting-ribs and inwardly-extending flanges at one end, of a cutting or shearing table, adjustably arranged on said supporting-ribs, and a means of adjustment connected with said inwardly-extending flanges and said table, substantially as and for the purposes set forth.

16. In a machine for cutting sheet metal, the combination, with a pair of standards having supporting-ribs 6, and inwardly-extending holding-flanges 16, a cutting or shearing table 7 arranged on said ribs 6, and a means of adjustment connected with said flanges and said table, consisting, of a set of adjusting-screws 18 and cap-screws 17, all arranged, substantially as and for the purposes set forth.

17. In a machine for cutting sheet metal, the combination, with a pair of standards having supporting-ribs 6, and inwardly-extending holding-flanges 16, a cutting or shearing table 7 arranged on said ribs 6, and a means of adjustment connected with said flanges and said table, consisting, of a set of adjusting-screws 18 and cap-screws 17, and cap-screws 14 arranged in slots in the sides of said standards and screwed into the sides of said table 7, substantially as and for the purposes set forth.

18. In a machine for cutting sheet metal, the combination, with a pair of standards, of a reciprocating knife-head and cutter, a rearwardly-extending rib 27 on said knife-head, rearwardly-extending guides 91 secured to said knife-head and moving up and down with the same, brackets at the free ends of said guides, bearings 93 and 94 connected with said brackets, a shaft 95 in said bearings 93 and means for turning said shaft, screws 99 between said guides 91 rotatively arranged in said bearings 94, and bevel-gears on said shaft 95 and on said screws 99, a nut movably arranged on each screw 99, a bracket 101 on each nut, and a gage-strip 102 connected with the said brackets 101, substantially as and for the purposes set forth.

19. In a machine for cutting sheet metal, a cutting bed or table having grooves 106, a guide-plate 108 arranged over said grooves, and a depression 117 in said table for the insertion of the hand beneath the metal sheet while upon the bed or table, substantially as and for the purposes set forth.

20. In a machine for cutting sheet metal, a cutting bed or table having grooves 106, a guide-plate 108 arranged over said grooves, receiving-sockets 102 connected with the front edge of said bed or table, and grooved bars 114 removably connected with said sockets, the grooves in said bars 114 being in alinement with the grooves in the bed or table for the reception of the guide-plate 108 above said bars 114, substantially as and for the purposes set forth.

21. In a machine for cutting sheet metal, the combination, with the cutting table or bed, of a clamping-leaf for holding the metal down upon said table or bed, a lever 79 pivotally connected with the machine-frame, means connected with said lever and said clamping-leaf for actuating the latter, and a spring attached to said lever 79 and a portion of the machine-frame, said spring causing the said clamping-leaf to automatically adjust itself to varying thicknesses of metal to be cut, substantially as and for the purposes set forth.

22. In a machine for cutting sheet metal, the combination, with the cutting table or bed, of a reciprocating knife-head and cutter, a shaft 35, and means between said shaft 35 and said knife-head for actuating the latter, a clutch-disk on said shaft, provided with a chambered portion, a clutch-dog slidably arranged in said chambered portion, a gear on said shaft, said gear having a recessed hub with which said clutch-dog can be brought in holding engagement, and means for holding said clutch-dog normally away from said hub, consisting, essentially, of a bearing 54 provided with a guide 55, a sliding sector above said bearing, a guide-arm on said sector arranged in said guide 55, an upwardly-extending projection on said bearing 54, having a chambered portion, and a spring in said chambered portion bearing against the side of said sector, and under normal conditions forcing the end of the clutch-dog away from sliding contact with the adjacent face of the hub of said gear-wheel, substantially as and for the purposes set forth.

In testimony that we claim the invention set forth above we have hereunto set our hands this 1st day of May, 1901.

GEORGE A. OHL, Sr.
GEORGE A. OHL, Jr.
FREDERICK W. THEBERATH.
AUGUST A. BERGHOF.

Witnesses:
FREDK. C. FRAENTZEL,
J. S. LA BAR.